United States Patent
Kalaimalai et al.

(10) Patent No.: US 10,812,602 B2
(45) Date of Patent: Oct. 20, 2020

(54) DEVICES AND METHODS FOR ENABLING COMMUNICATION BETWEEN A SINGLE CLIENT COMPUTER AND MULTIPLE DIFFERENT SERVICES ON A SERVER COMPUTER, EACH SERVICE HAVING A DIFFERENT, INCOMPATIBLE CLIENT PROFILE

(71) Applicant: ADP, LLC, Roseland, NJ (US)

(72) Inventors: Madhu Kalaimalai, Pasadena, CA (US); Ajit Kumar, San Dimas, CA (US); Michael Plonski, Pasadena, CA (US); Beena Matthews, Pasadena, CA (US)

(73) Assignee: ADP, LLC, Roseland, NJ (US)

( * ) Notice: Subject to any disclaimer, the term of this patent is extended or adjusted under 35 U.S.C. 154(b) by 180 days.

(21) Appl. No.: 16/016,397

(22) Filed: Jun. 22, 2018

(65) Prior Publication Data

US 2019/0394285 A1 Dec. 26, 2019

(51) Int. Cl.
*H04L 29/06* (2006.01)
*H04L 29/08* (2006.01)

(52) U.S. Cl.
CPC .............. *H04L 67/16* (2013.01); *H04L 63/08* (2013.01); *H04L 67/306* (2013.01); *H04L 67/42* (2013.01)

(58) Field of Classification Search
CPC ....... H04L 67/16; H04L 63/08; H04L 67/306; H04L 67/42
See application file for complete search history.

(56) References Cited

U.S. PATENT DOCUMENTS

| 5,655,077 | A | 8/1997 | Jones et al. |
|---|---|---|---|
| 8,073,810 | B2 | 12/2011 | Maes |
| 8,661,084 | B1* | 2/2014 | McKinnon ............. G06Q 10/10 709/203 |
| 10,469,330 | B1* | 11/2019 | Roth ........................ H04L 41/22 |
| 2010/0106744 | A1* | 4/2010 | Wang .................. G06F 16/1834 707/783 |
| 2011/0153727 | A1 | 6/2011 | Li |
| 2013/0110776 | A1* | 5/2013 | Nunez Diaz ............ H04L 67/06 707/624 |
| 2016/0124742 | A1* | 5/2016 | Rangasamy ............ H04L 47/70 717/103 |

* cited by examiner

*Primary Examiner* — Tonia L Dollinger
*Assistant Examiner* — Jihad K Boustany
(74) *Attorney, Agent, or Firm* — Yee & Associates, P.C.

(57) ABSTRACT

A method for enabling communication between a client computer and multiple services on a server, wherein the multiple services have differing, incompatible client profiles. A client request to access the service is received. An identity of the client is determined at an orchestration layer based on a general client identifier independent of the services. The client identifier also includes a mapping to specific client identifiers associated with ones of the services. A particular common client profile for the client is accessed. An API (application programming interface) in the orchestration layer routes the request to a specific API for the corresponding service. The specific API interfaces with a corresponding single module that provides the service. The API transmits needed information from the particular common client profile to a corresponding module client profile associated with the corresponding single module. The service is provided to the client computer accordingly.

24 Claims, 9 Drawing Sheets

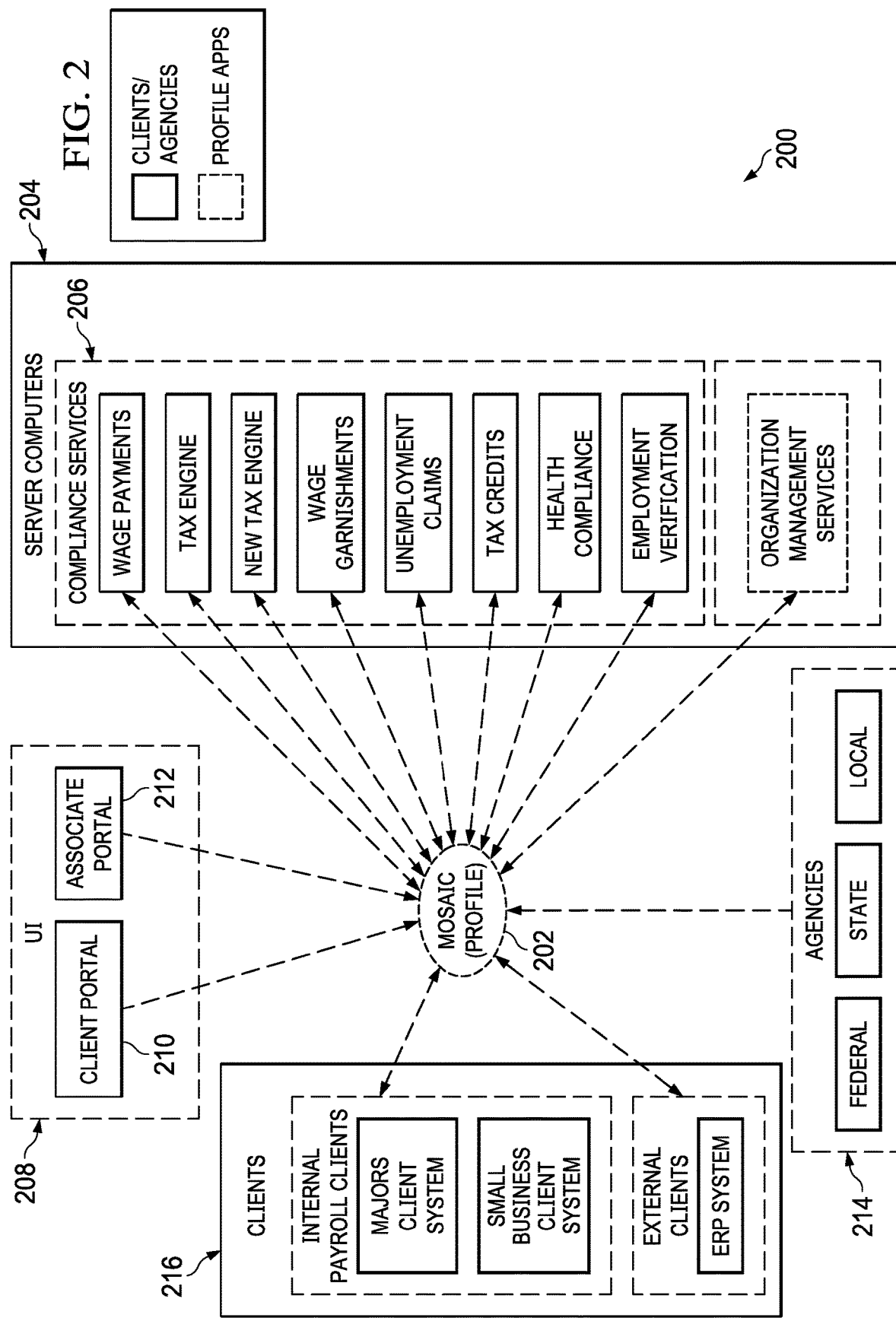

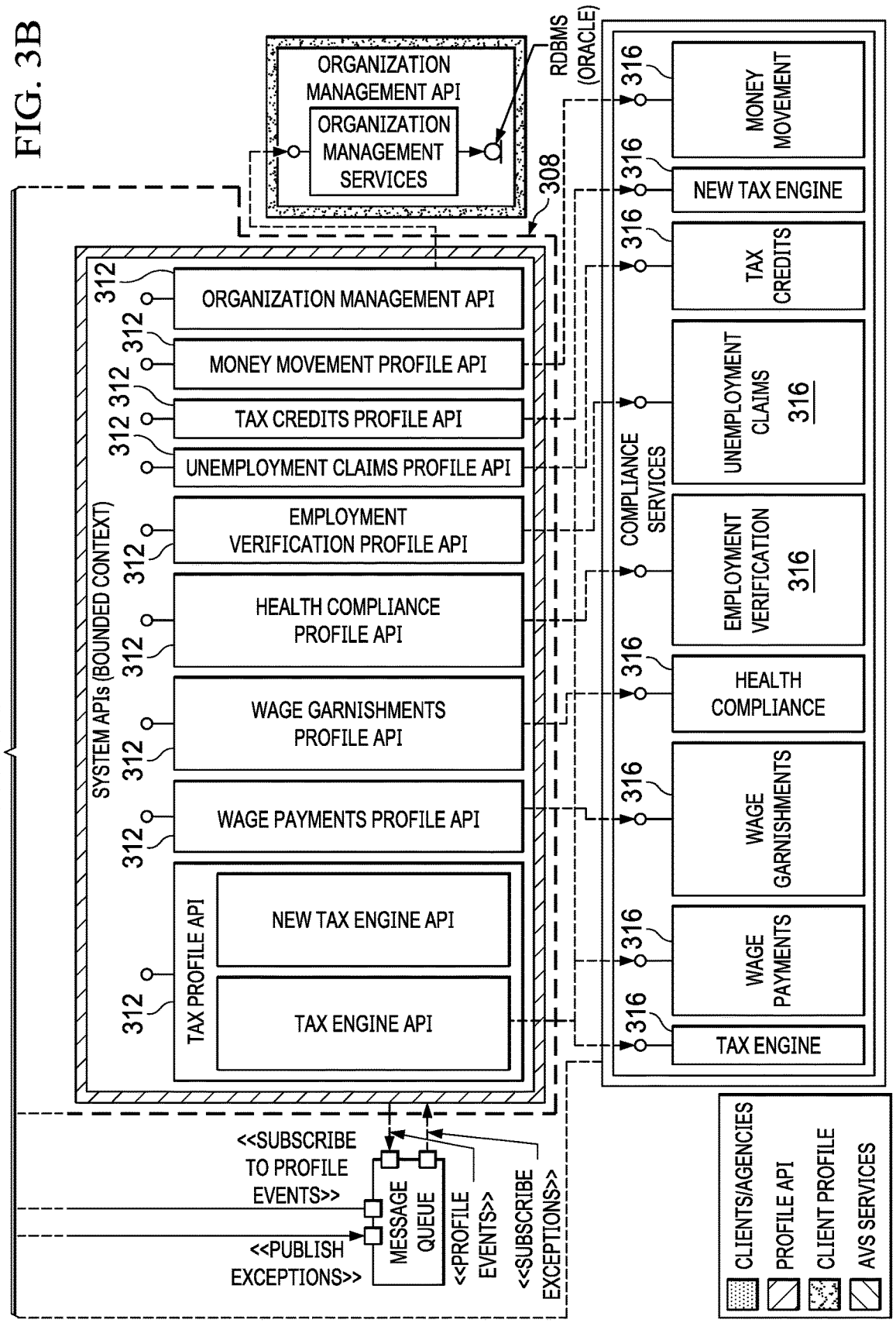

DEVICES AND METHODS FOR ENABLING COMMUNICATION BETWEEN A SINGLE CLIENT COMPUTER AND MULTIPLE DIFFERENT SERVICES ON A SERVER COMPUTER, EACH SERVICE HAVING A DIFFERENT, INCOMPATIBLE CLIENT PROFILE

BACKGROUND INFORMATION

1. Field

The present disclosure relates to devices and methods for enabling communication between a single client computer and multiple different services on a server computer, each service having a different, incompatible client profile.

2. Background

Increasingly, businesses are offering software as a service to clients. Clients typically access these services via the Internet. Often there exists no unified management of a client's profile across multiple services offered by a provider. For example, a business may purchase a suite of services from a single provider. Such services may include tax preparation, payroll management, human resources management, employment tax, wage garnishment, unemployment claims, tax credits, health compliance, employment verification, W2 management, wage payments, and possibly many others.

However, because there is no unified management of the client's profile across these services, problems can arise. For example, a single sign-on may not be sufficient for a client to access all services because the client profiles required by different services may be different or even incompatible. In another example, changes to the client profile resulting from, among other reasons, name changes, address changes, and other profile changes may not propagate to the various different client profiles of the different services offered to the client. In still another example, possibly months of time may be needed to prepare a large client to develop all the different client profiles for the different services. In some cases, the client may be asked to provide the same information multiple times in different formats to subscribe to each individual service. As a result, not only is unnecessary duplication an issue, but when information needs to be updated it must be updated across all of the profiles for the different services. Accordingly, data out-of-sync errors can arise, which could result in penalties and interest in the case of tax entities not receiving timely information.

Again, a single sign-on or single client profile is often impossible in such enterprise systems. The reason is that each service requires, that is expects to receive, information in a specific format from a specific profile that is unique to the service. In other words, each service requires its own client profile, and each profile is often incompatible with other profiles. As a result, time and money can be wasted, and clients may become frustrated with the service provider. Another challenge is that there is no unique way to identify a client across these services.

Therefore, solutions are sought to address these and other issues with respect to running a multiple service online enterprise. The illustrative embodiments described below address these and other issues.

SUMMARY

The illustrative embodiments provide for a method for enabling communication between a single client computer and a plurality of different services on one or more server computers, wherein ones of the plurality of different services have differing, incompatible corresponding client profiles. The method also includes receiving, at an orchestration layer maintained by an orchestration computer, a request by a client to access a service in the plurality of different services. The method also includes determining, by the orchestration computer, an identity of the client from a database that stores a plurality of client identifiers for each client, the plurality of client identifiers including a general client identifier independent of the plurality of different services, the plurality of client identifiers also including a mapping from the general client identifier to a plurality of specific client identifiers associated with ones of the plurality of different services. The method also includes accessing, based on the general client identifier, a particular common client profile for the client, the particular common client profile being among a plurality of common client profiles. The method also includes, based on the identity, the particular common client profile, and on the request, routing, via an application programming interface gateway, the request to a specific application programming interface from among a plurality of different application programming interfaces for the plurality of services. Each of the plurality of different application programming interfaces are designed to interface with a corresponding single module stored on the server computer that provides a corresponding service. The method also includes transmitting, via the specific application programming interface, needed information from the particular common client profile to a corresponding module client profile associated with the corresponding single module in a format which the corresponding single module needs. The module client profile is necessary to operate the service. The method also includes providing, via the server computer and after transmitting, the service to the client computer.

The illustrative embodiments also contemplate a computer including a processor and a non-transitory computer readable storage medium storing program code which, when executed by the processor, performs the above method. The illustrative embodiments also contemplate such a non-transitory computer readable storage medium itself.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is a block diagram illustrating an overview of an orchestration service for managing disparate client profiles, in accordance with an illustrative embodiment;

FIGS. 3A-3B are a detailed block diagram of the orchestration service described in FIG. 2, in accordance with an illustrative embodiment;

DETAILED DESCRIPTION

Figure 1A:
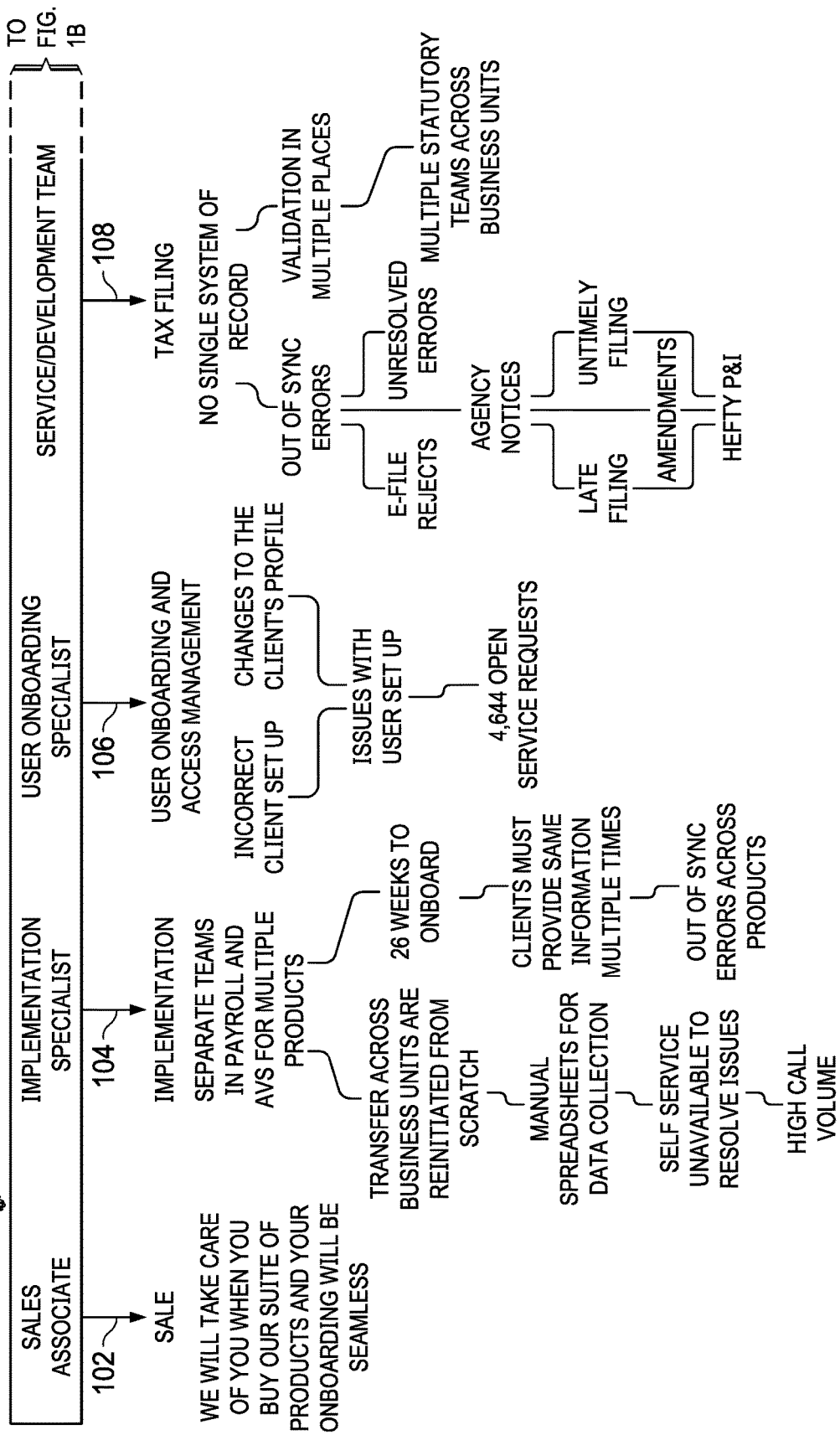
FIGS. 1A-1B are a graphic illustrating challenges with client onboarding and maintenance for an online enterprise of multiple disparate services, in accordance with an illustrative embodiment.

The illustrative embodiments recognize and take into account the problems of maintaining client files in an online service enterprise having disparate services with disparate client identifiers and client profiles, as described above in the Background. The illustrative embodiments also recognize and take into account that, for many enterprise systems, there is currently no way to identify a client uniquely across the different services.

Thus, the illustrative embodiments provide for an orchestration layer in an online enterprise to setup and maintain a single client's profile across multiple services in the online enterprise. The illustrative embodiments hide the complexity of legacy systems and services by providing an easy-access application programming interface at a domain level, rather than at a product or service level.

Therefore, the illustrative embodiments provide for a technical effect that is particular to computers. In particular, the illustrative embodiments improve communication between client computers and server computers that provide software services. More particularly, the illustrative embodiments enable rapid client profile establishment as well as automatic updates to unique client profiles that are established for each of a group of software services. In other words, the illustrative embodiments enable the technical effect of establishing, updating, and communicating with multiple disparate and sometimes incompatible data structures (the individual service client profiles) using a single data structure (a domain level client profile) that is managed at an intervening orchestration layer separate and distinct from the service layer in which the actual services and disparate data structures are maintained. These issues exist only in computer networks and computer communications, and thus the illustrative embodiments are directed at addressing a purely technical problem that arises only in communications between computers and computer networks.

The illustrative embodiments may be marketed and referred to as the name "Mosaic". However, "Mosaic" actually refers to one or more data structures, data models, and/or computer code which enables the orchestration and technical effects described above. For the sake of brevity in the following description, the term "Mosaic" may be referred to as accomplishing certain tasks in a computer network; however, again, the term actually only refers to data structures, data models, and software code which enables the claimed functions. The term "Mosaic" could be replaced by different names without changing the underlying nature of the data structures, data models, and software which implements the illustrative embodiments described herein.

Additional details regarding these data structures and data models are provided below. Software code to accomplish the illustrative embodiments described herein is assumed to be programmable by the ordinary artisan, but only after having reviewed the architecture, data structures, and data models described herein. Otherwise, such code would be beyond the skill of the ordinary artisan.

In an illustrative embodiment, from the client's perspective only, Mosaic provides a one-stop service to setup and maintain a single client profile. While the client only sees this convenience, the underlying data structures and data models actually provide different services by interfacing the single client profile with multiple different client profiles, each unique to a given service. Thus, Mosaic orchestrates the single client profile across multiple integrations with each of the data structures, data models, and software that enable the services desired by the client.

With Mosaic, the client provides information once, which is entered into a data structure for the single client profile, in order to subscribe to multiple services. Mosaic hides the complexity of each service with one simplified domain language for the calling application. Mosaic raises profile domain events based on updates from agencies that solves data-out-of-sync errors automatically across multiple calling applications.

Thus, the illustrative embodiments enable a useful technical effect which not only improves the client's user experience with computer communication, but also increases the speed and efficiency of that computer communication. Further details regarding the illustrative embodiments are provided with respect to the Figures, below.

Figure 1B:
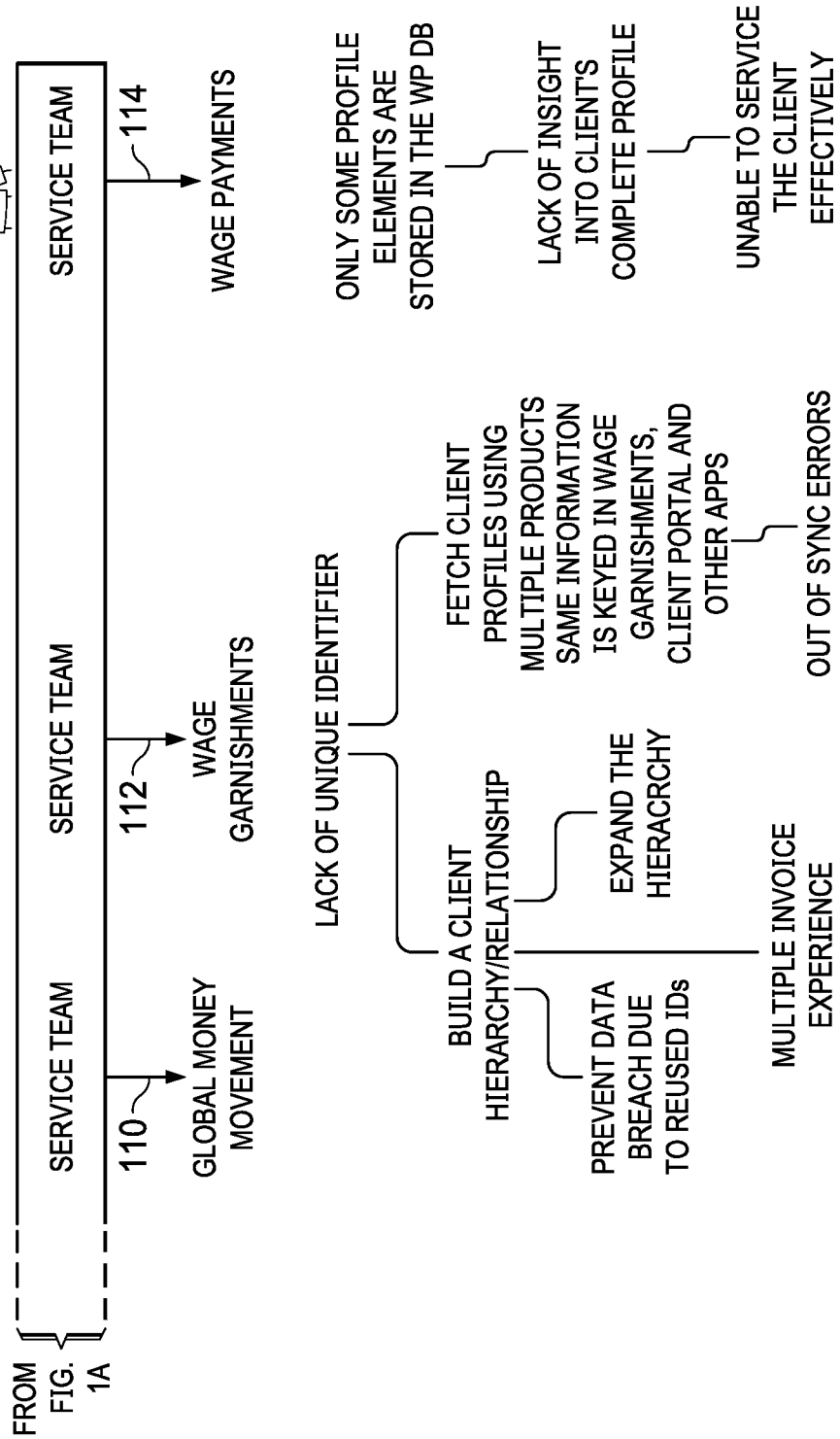

FIGS. 1A-1B are a graphic illustrating challenges with client onboarding and maintenance for an online enterprise of multiple disparate services, in accordance with an illustrative embodiment. Process 100 also indicates a typical process of how a client is introduced to a suite of services provided by the service provider.

Initially, at sale 102, the provider promises access to a suite of services that will satisfy the client's business needs. In fact, the services can satisfy the client's business needs; however, as described below, technical issues with communication between the client's computer and the server or servers that support the services can lead to client frustration.

At implementation 104 each service is supported by a separate support team who may or may not be familiar with the technical details of the other products in the suite of services. As a result, transfer of data and client IDs across services are not possible but must be reinitiated from scratch. Multiple weeks are needed to onboard all services, manual spreadsheets are needed for data collection, the client must provide the same information multiple times, self-service is unavailable, high call volume, and out-of-sync errors can occur across products.

At user onboarding and access management 106, these problems can compound. An incorrect client setup or changes to a client's user profile can result in further errors.

Furthermore, problems can occur with specific services. For example, in FIGS. 1A-1B, four services are provided: tax filing 108, global money movement 110, wage garnishments 112, and wage payments 114. Each is supported by a different service team. There is no single system of record for tracking changes to client information. Without a unique identifier, confusion can result. The services can return data-out-of-sync errors, causing slowdowns and frustration for the client. Other problems can result. In the end, the client may be left frustrated and the service provider unable to service the client effectively, possibly leading to the service provider losing business.

These problems are ultimately driven by the underlying technology that manages the communications between the client computers and the server computers that have the data structures, data models, and software that actually implement the desired services. Thus, the illustrative embodiments provide a technical solution to the problem by providing an orchestration layer which can interface with all the different services. Thus, the client sees only one single profile and one onboarding and access management operation, even though the services all use different client profiles which may have incompatible data structures or data models. These illustrative embodiments are described further below.

FIG. 2 is a block diagram illustrating an overview of an orchestration service for managing disparate client profiles, in accordance with an illustrative embodiment. Data architecture 200 provides a technical solution to the problems described above, such as with respect to process 100.

At the center of the technical solution is an orchestration layer referred to as "Mosaic" 202, which term is defined above. Additional details regarding Mosaic 202 are described with respect to FIGS. 3A-3B. However, the purpose of FIG. 2 is to show the overall connection between remote computers and the server computers 204 which provide services 206. A single user interface 208 provides a smart compliance portal 210 for the client as well as an associate portal 212 for any associates of the client. The client only sees this one portal, so the client does not perceive multiple different services 206.

In addition, different agencies 214 can access Mosaic 202 to provide updates. For example, tax laws change yearly, and these laws result in changes to the code, data structures, and data models of services 206. With Mosaic 202, agencies 214 can provide the changes to the laws and procedures, and Mosaic 202 can facilitate the translation of these laws into computer code, data structures, and data models. Alternatively, Mosaic 202 can pull this information from agencies 214 and then incorporate it into services 206.

Again, clients 216 only see a single suite of services. Mosaic 202 handles management of a single client profile, updating of the necessary individual, possibly incompatible, client profiles of services 206, and any other desirable updates or communication services between the computers.

Figure 3A:
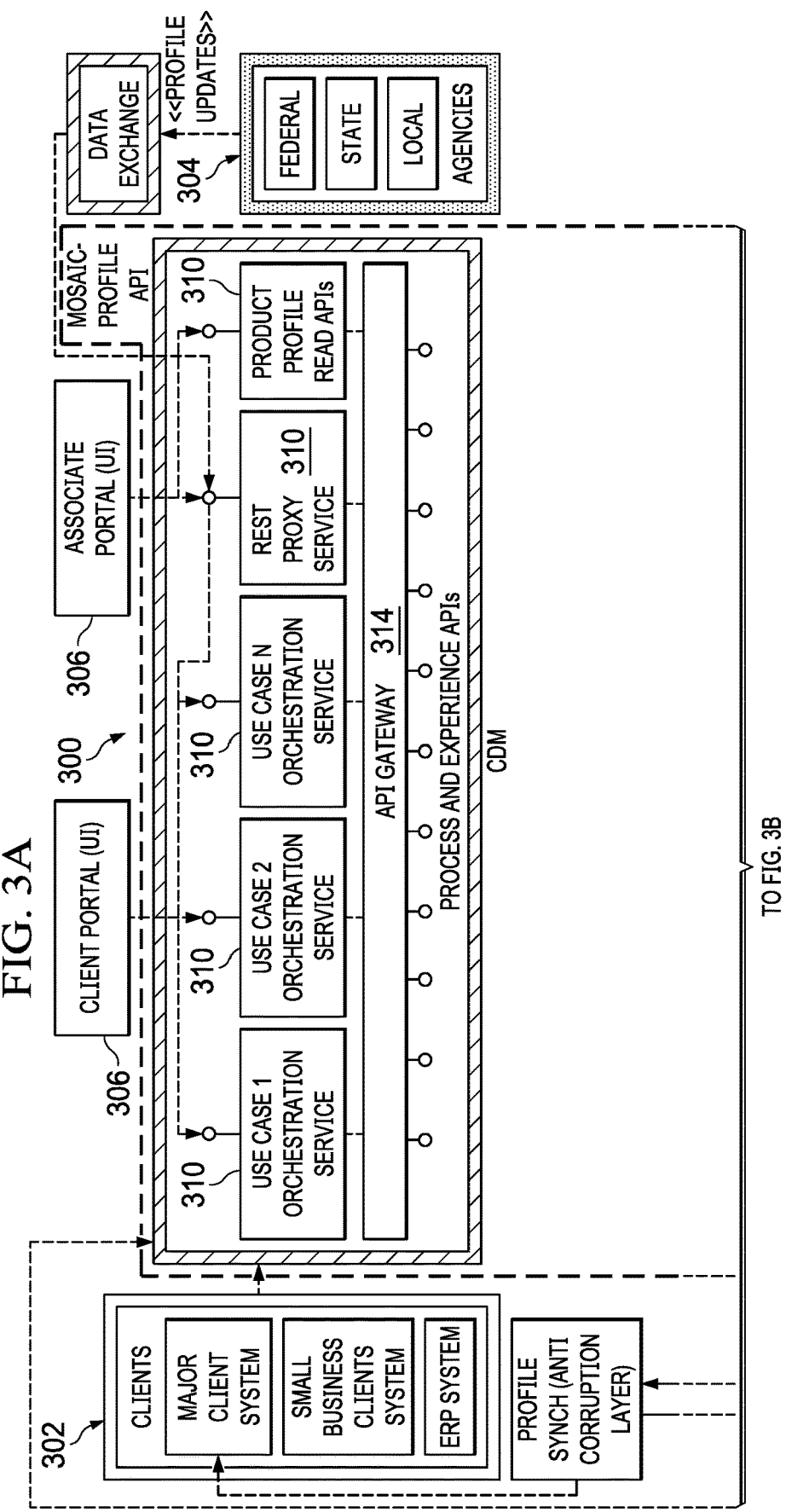

FIGS. 3A-3B are a detailed block diagram of the orchestration service described in FIG. 2, in accordance with an illustrative embodiment. Like data architecture 200, data architecture 300 includes client computers 302, agency computers 304, user interface portals 306, and mosaic 308.

Mosaic 308 includes a plurality of orchestration services 310 which communicate with the user interface portals. Each individual orchestration service is used to communicate with a corresponding system application programming interface in plurality of system application programming interfaces 312 via application programming interface gateway 314. Each orchestration service receives information from a single client profile which is a data structure that contains all of the information needed for all of the individual client profiles used by plurality of services 316. Thus, if the single client profile changes, a corresponding individual profile maintained for a specific service can be updated. In an illustrative embodiment, each service profile can subscribe to changes published in the orchestration layer.

In the illustrative embodiments, the plurality of services 316 remain the system of record for each client product profile and they expose the system of record application programming interface. Profile application programming interfaces are maintained in a single entry point to read and write each client product profile through restful application programming interfaces. A restful application programming interface is an application programming interface that uses hypertext transfer protocol (HTTP) requests to get, put, post, and delete data. A restful application programming interface is based on a representational state transfer ("REST") technology, an architectural style and approach to communications in web services development.

The profile application programming interfaces provide one common user interface to setup and update the multiple client product profiles and is exposed through one or more of the user interface portals 306. Profile application programming interfaces emit the profile events to the event bus and the interested parties (that is, the services) subscribe to the events. Exception cases may be addressed through an anti-corruption layer.

However, the organization management application programming interface contains the different product IDs and organization groupings for various business needs. Thus, a single client profile can be maintained and reconciled across many disparate and possibly incompatible individual client profiles that are needed to operate the various plurality of services 316.

Figure 4:
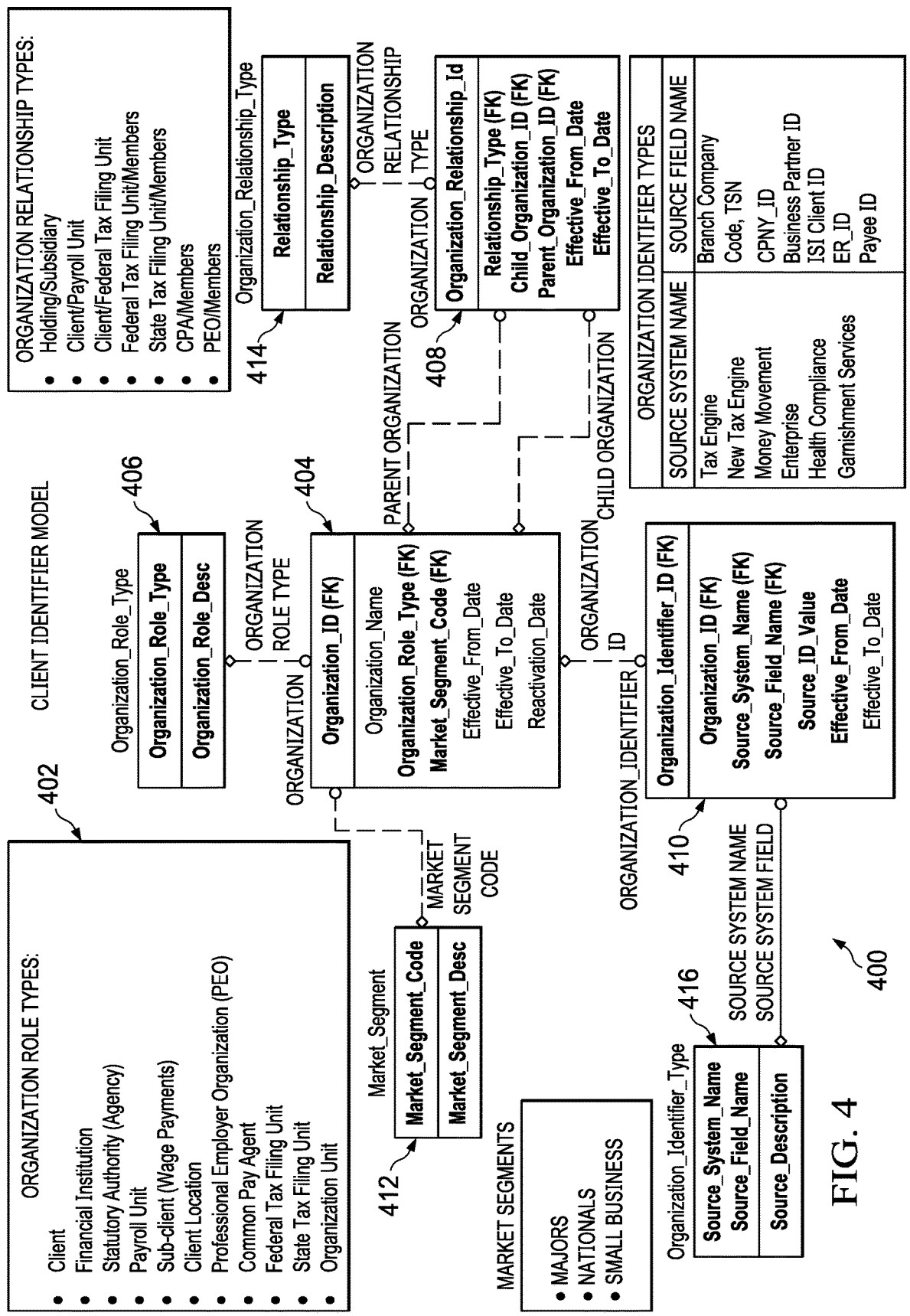
FIG. 4 is a data model for implementing a client identifier useable together with an orchestration service, such as shown in FIG. 2 or FIGS. 3A-3B, in accordance with an illustrative embodiment.

FIG. 4 is a data model for implementing a client identifier useable together with an orchestration service, such as shown in FIG. 2 or FIGS. 3A-3B, in accordance with an illustrative embodiment. Thus, data model 400 may be used in implementing Mosaic 202 of FIG. 2 or Mosaic 308 of FIG. 3B. In particular, data model 400 is a client identifier model that is used to implement the single client profile described above with respect to FIG. 2 and FIGS. 3A-3B.

Data model 400 is used to address and maintain a variety of organization role types 402. A central aspect of data model 400 is organization 404, which is a data structure, which described the organization in question. Organization 404 communicates with other data structures, including organization role type 406, organization structure 408, organization identifier 410 and market segment 412. Organization 404 may communicate with other data structures, as needed to support the various services to which the underlying organization subscribes.

The various data structures supporting the data structure of organization 404 may themselves have additional supporting data structures. In this example, organization data structure 408 is supported by organization relationship type 414, which is a data structure that includes information about the relationship types relevant to the underlying organization, as described in organization role types 402. Likewise, the organization identifier 410 data structure is supported by organization identifier type 416 data structure.

Ultimately, client identifier model 400 provides for a data structure that supports a plurality of disparate client profiles, each needed for its associated service. Note that data is not duplicated multiple times, as occurred in prior enterprise services, but rather a single data entry is needed for a given data point for a given user. As information in data model 400 changes or is updated, such changes can be pushed or pulled to the individual service client profiles as needed in order to operate. In this manner, all the user sees is a single sign on experience to access all services for which the user paid to have access. However, the data model and Mosaic orchestration service described herein is the technical solution that allows the desired communication between computers to take place.

Note that the term "single sign on" is known in the art. However, a single sign on technology would not work in this enterprise. The reason is that a "single sign on service" only maintains username and password information, or other security information, which is passed to multiple access points automatically. However, this information is insufficient in an enterprise such as the one described herein, because each individual service must maintain its own client profile in order to provide the desired service. Again, duplicating information among these solitary profiles is time consuming, frustrating, and often leads to errors. Thus, a "single sign on" service simply could not solve the technical computer communication problems described above. Instead, the illustrative embodiments described above with respect to Mosaic and data model 400 are needed.

For data model 400, every organization entity for which information is stored has a unique identifier. This unique identifier is preferably not the name of the organization, because the name of the organization can change over time. Possible unique identifiers could be a preselected alphanumeric sequence, a system generated surrogate key, an owner operated identification, an employer tax identification number, a social security number, or some other unique identifier. The unique identifier does not have built-in meaning that will be impacted by changes to the organization's name, location, or organizational structure. Data model 400 explicitly stores relationships between organizational entities, rather than deriving relationships through common attributes. Data model 400 manages effective dating to manage events such as termination, reactivations, spinoffs, takeovers, mergers, acquisitions, and the like.

Figure 5:
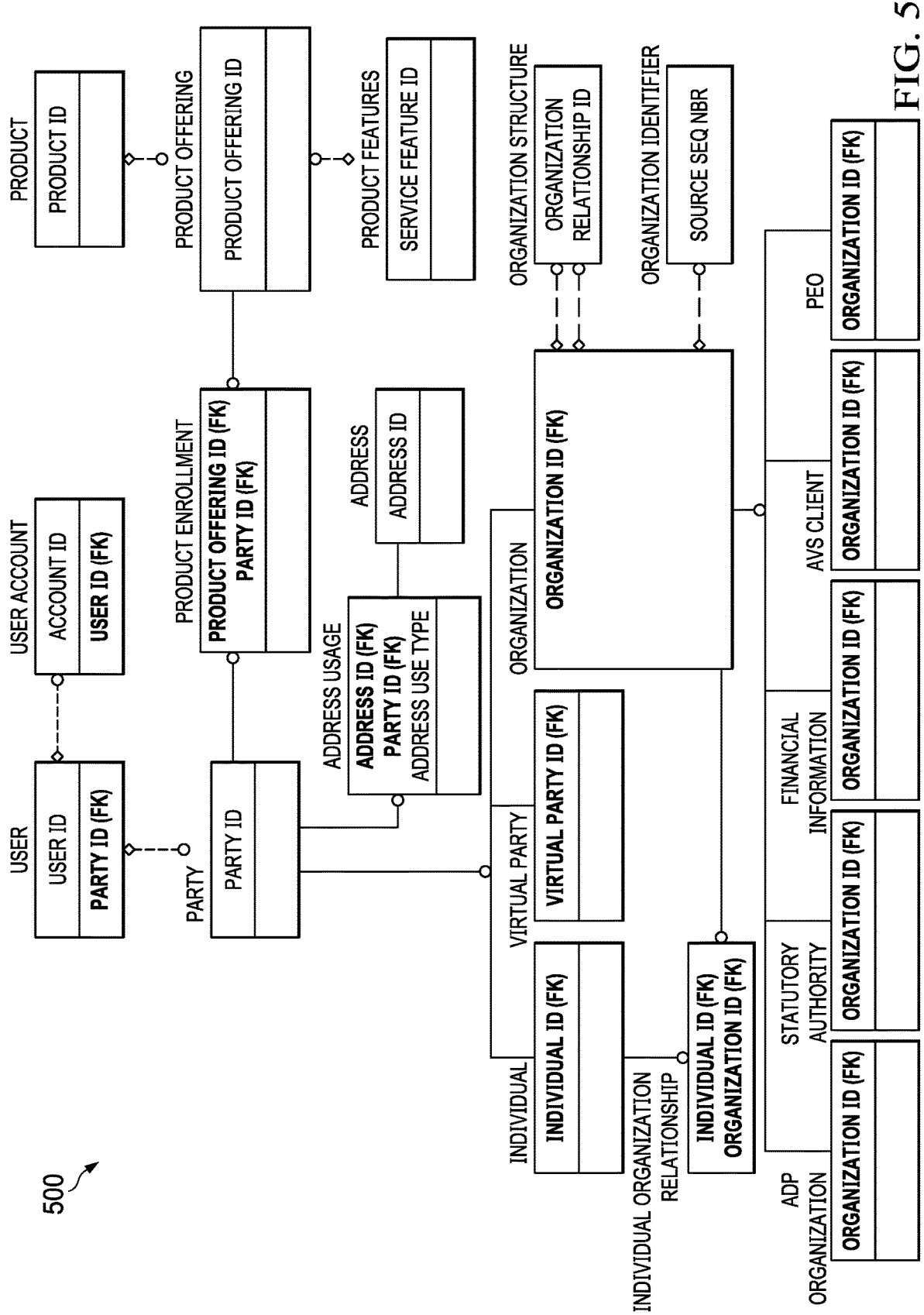
FIG. 5 is a data model for implementing shared data among service modules, such as those shown in FIG. 2 and FIGS. 3A-3B, in accordance with an illustrative embodiment.

FIG. 5 is a data model for implementing shared data among service modules, such as those shown in FIG. 2 and FIGS. 3A-3B, in accordance with an illustrative embodiment. Thus, data model 500 may be used in conjunction with data model 400 of FIG. 4 to allow the disparate, possibly incompatible, client profiles of the various services to share data via the orchestration layer. In this manner, the illustrative embodiments increase both the speed and efficiency of communication among computers.

Data model 500 and data model 400 can be used to establish a relational database schema to serve as the system of record for client identifiers. Thus, again, while the user sees a single sign-on experience, the illustrative embodiments provide the underlying technology that allows for disparate systems to communicate seamlessly with the client computer to provide the services for which the client has paid. These services to which the client has subscribed are used for compliance reasons like employment tax, wage garnishment, etc.

Figure 6:
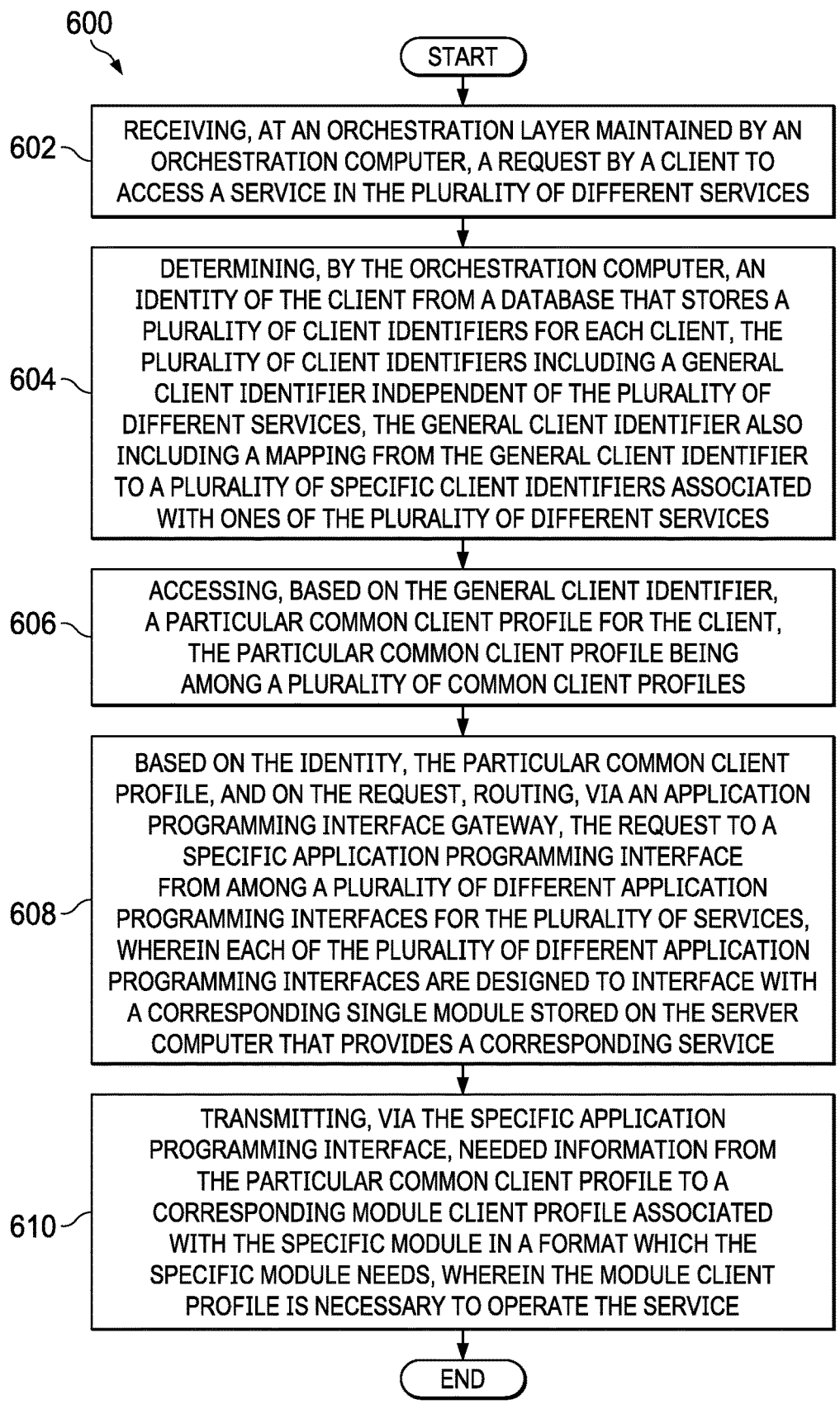
FIG. 6 is a method for enabling communication between a single client computer and a plurality of different services on one or more server computers, wherein ones of the plurality of different services have differing, incompatible corresponding client profiles, in accordance with an illustrative embodiment.

FIG. 6 is a method for enabling communication between a single client computer and a plurality of different services on one or more server computers, wherein ones of the plurality of different services have differing, incompatible corresponding client profiles, in accordance with an illustrative embodiment. Method 600 may be implemented using a server computer using one or both of data model 400 of FIG. 4 and data model 500 of FIG. 5 within data architecture 200 of FIG. 2 or data architecture 300 of FIGS. 3A-3B. The server computer may include a processor and a non-transitory computer readable storage medium storing program code which, when implemented by the processor, performs method 600.

Method 600 may be characterized as a method for enabling communication between a single client computer and a plurality of different services on one or more server computers. Ones of the plurality of different services have differing, incompatible corresponding client profiles.

Method 600 includes receiving, at an orchestration layer maintained by an orchestration computer, a request by a client to access a service in the plurality of different services (operation 602). Method 600 also includes determining, by the orchestration computer, an identity of the client from a database that stores a plurality of client identifiers for each client, the plurality of client identifiers including a general client identifier independent of the plurality of different services, the general client identifier also including a mapping from the general client identifier to a plurality of specific client identifiers associated with ones of the plurality of different services (operation 604). The method also includes accessing, based on the general client identifier, a particular common client profile for the client, the particular common client profile being among a plurality of common client profiles (operation 606). The method also includes, based on the identity, the particular common client profile, and on the request, routing, via an application programming interface gateway, the request to a specific application programming interface from among a plurality of different application programming interfaces for the plurality of services, wherein each of the plurality of different application programming interfaces are designed to interface with a corresponding single module stored on the server computer that provides a corresponding service (operation 608). The method also includes transmitting, via the specific application programming interface, needed information from the particular common client profile to a corresponding module client profile associated with the corresponding single module in a format which the corresponding single module needs, wherein the module client profile is necessary to operate the service (operation 610).

Method 600 may be varied. For example, in an illustrative embodiment, the plurality of different application programming interfaces comprises restful application programming interfaces, wherein the restful application programming interfaces are configured to break down a transaction to create a series of smaller modules, each of the smaller modules configured to execute an underlying part of a given transaction.

Method 600 may also have additional operations. For example, method 600 may also include broadcasting, by a profile application programming interface in the orchestration layer, updates to the plurality of common client profiles, whereby updates to the plurality of common client profiles are automatically propagated throughout the orchestration layer.

In another illustrative embodiment, method 600 may also include preventing direct updates to module client profiles of a plurality of different modules that correspondingly operate the plurality of different services. Preventing direct updates avoids out-of-sync errors and enforces a central orchestration service.

In yet another illustrative embodiment, method 600 may also include adding a pre-existing service module to the plurality of services, the pre-existing service module having a pre-existing data structure for maintaining client profiles, the pre-existing data structure being incompatible with ones of data structures for others of the plurality of service modules, the pre-existing service module configured to provide a new service. Thus, the illustrative embodiments are not limited to a new enterprise, but may be used to add additional services to an enterprise or may be used to orchestrate an existing legacy enterprise. In an illustrative embodiment, the orchestration service may be provided as a service itself.

Thus, in still another illustrative embodiment, method 600 may also include adding a new application programming interface to the orchestration layer, the new application programming interface configured to interface with the pre-existing service module and to provide data in the plurality of common client profiles in a form, suitable for the pre-existing data structure. Still other variations are possible For example, the illustrative embodiments also contemplate receiving a request to access the new service from the client. In this case, method 600 may also include providing the new service to the client via the new application programming interface and the orchestration layer using only a single set of client login credentials.

Still other variations are possible. Thus, the examples, described with respect to FIG. 6, do not necessarily limit the claimed inventions or the other illustrative embodiments described herein.

Figure 7:
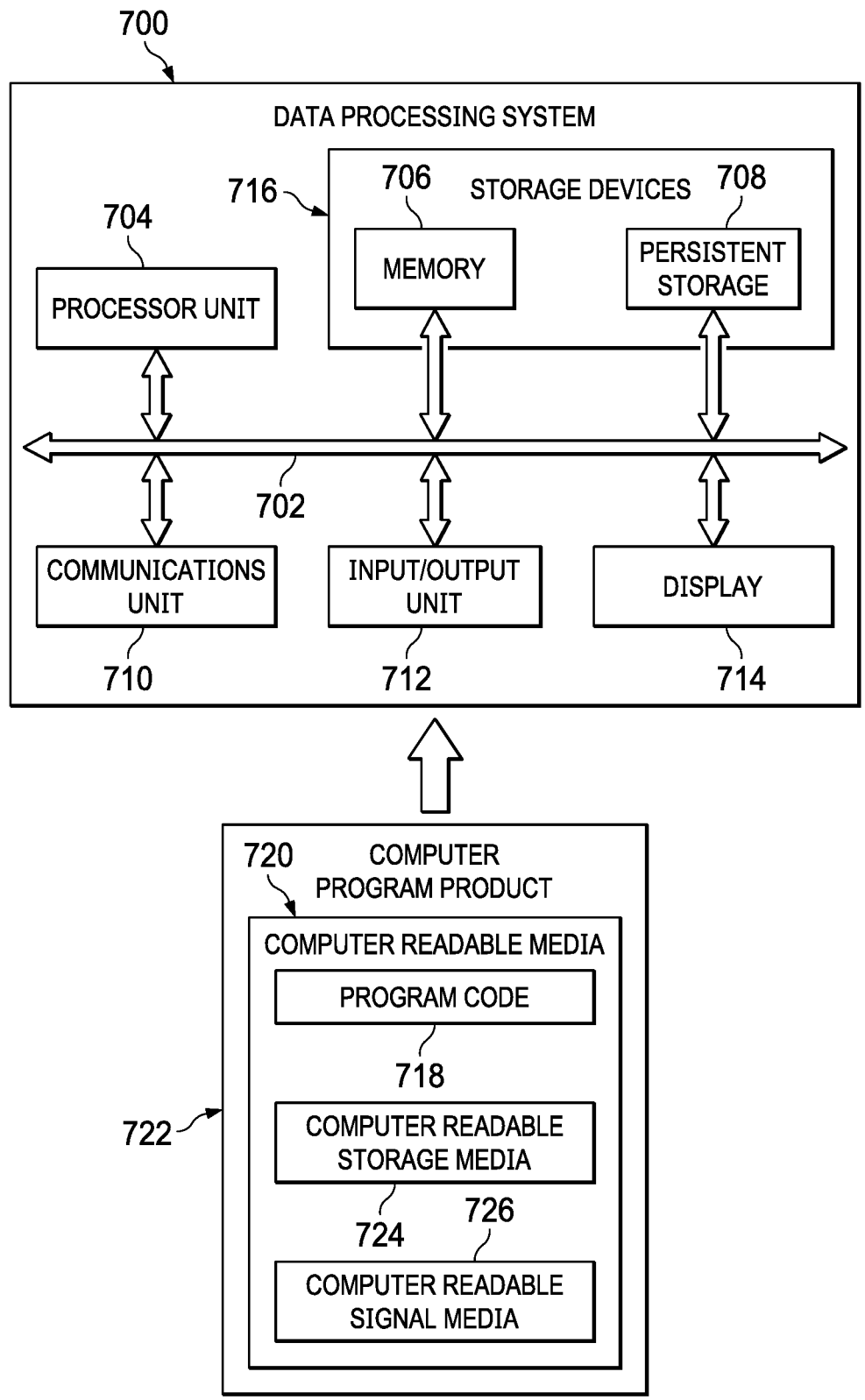
FIG. 7 illustrates a data processing system, in accordance with an illustrative embodiment.

Turning now to FIG. 7, an illustration of a data processing system is depicted in accordance with an illustrative embodiment. Data processing system 700 in FIG. 7 is an example of a data processing system that may be used to implement the illustrative embodiments, such those described with respect to FIG. 2 through FIG. 7. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. This software may be a content addressable memory, or software for implementing the processes described elsewhere herein. Thus, for example, software loaded into memory 706 may be software for executing the methods described with respect to FIG. 2 through FIG. 7. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for enabling communication between a single client computer and a plurality of different services on one or more server computers, wherein ones of the plurality of different services have differing, incompatible corresponding client profiles, the method comprising:
   receiving, at an orchestration layer maintained by an orchestration computer, a request by a client to access a service in the plurality of different services;
   determining, by the orchestration computer, an identity of the client from a database that stores a plurality of client identifiers for each client, the plurality of client identifiers including a general client identifier independent of the plurality of different services, the general client identifier also including a mapping from the general client identifier to a plurality of specific client identifiers associated with ones of the plurality of different services;
   accessing, based on the general client identifier, a particular common client profile for the client, the particular common client profile being among a plurality of common client profiles;
   based on the identity, the particular common client profile, and on the request, routing, via an application programming interface gateway, the request to a specific application programming interface from among a plurality of different application programming interfaces for the plurality of different services, wherein each of the plurality of different application programming interfaces are designed to interface with a corresponding single module stored on the server computer that provides a corresponding service;
   transmitting, via the specific application programming interface, needed information from the particular common client profile to a corresponding module client profile associated with a corresponding single module in a format which the corresponding single module needs, wherein the corresponding module client profile is necessary to operate the service; and
   providing, via the server computer and after transmitting, the service to the single client computer,
   wherein as information in a client identifier data model changes, such changes can be pushed and pulled to individual service client profiles corresponding to ones of the plurality of different services,
   wherein ones of the plurality of different services are operated based on the changes that are pushed and pulled to individual service client profiles corresponding to ones of the plurality of different services.

2. The method of claim 1, wherein the plurality of different application programming interfaces comprises restful application programming interfaces, wherein the restful application programming interfaces are configured to break down a transaction to create a series of smaller modules, each of the smaller modules configured to execute an underlying part of a given transaction.

3. The method of claim 1 further comprising:
   broadcasting, by a profile application programming interface in the orchestration layer, updates to the plurality of common client profiles, whereby updates to the plurality of common client profiles are automatically propagated throughout the orchestration layer.

4. The method of claim 1 further comprising:
   preventing direct updates to module client profiles of a plurality of different modules that correspondingly operate the plurality of different services.

5. The method of claim 1 further comprising:
   adding a pre-existing service module to the plurality of services, the pre-existing service module having a pre-existing data structure for maintaining client profiles, the pre-existing data structure being incompatible with ones of data structures for others of the plurality of service modules, the pre-existing service module configured to provide a new service.

6. The method of claim 5 further comprising:
   adding a new application programming interface to the orchestration layer, the new application programming interface configured to interface with the pre-existing service module and to provide data in the plurality of common client profiles in a form suitable for the pre-existing data structure.

7. The method of claim 6 further comprising:
   receiving a request to access the new service from the client; and
   providing the new service to the client via the new application programming interface and the orchestration layer using only a single set of client login credentials.

8. A computer comprising:
   a processor; and
   a computer readable storage media storing program code which, when executed by the processor, performs a computer-implemented method for enabling communication between a single client computer and a plurality of different services on one or more server computers, wherein ones of the plurality of different services have differing, incompatible corresponding client profiles, the program code comprising:
   program code for receiving, at an orchestration layer maintained by an orchestration computer, a request by a client to access a service in the plurality of different services;
   program code for determining, by the orchestration computer, an identity of the client from a database that stores a plurality of client identifiers for each client, the plurality of client identifiers including a general client identifier independent of the plurality of different services, the general client identifier also including a mapping from the general client identifier to a plurality of specific client identifiers associated with ones of the plurality of different services;
   program code for accessing, based on the general client identifier, a particular common client profile for the client, the particular common client profile being among a plurality of common client profiles;
   program code for, based on the identity, the particular common client profile, and on the request, routing, via an application programming interface gateway, the request to a specific application programming interface from among a plurality of different application programming interfaces present in the orchestration layer, wherein each of the plurality of different application programming interfaces are designed to interface with a corresponding single module stored on the server computer that provides a corresponding service;
   program code for transmitting, via the specific application programming interface, needed information from the particular common client profile to a corresponding module client profile associated with a corresponding single module in a format which the corresponding single module needs, wherein the corresponding module client profile is necessary to operate the service; and program code for providing, via the server computer and after transmitting, the service to the single client computer, wherein as information in a client identifier data model changes, such changes can be pushed and pulled to individual service client profiles corresponding to ones of the plurality of different services, wherein ones of the plurality of different services are operated based on the changes that are pushed and pulled to individual service client profiles corresponding to ones of the plurality of different services.

9. The computer of claim 8, wherein the plurality of different application programming interfaces comprises restful application programming interfaces, wherein the restful application programming interfaces are configured to break down a transaction to create a series of smaller modules, each of the smaller modules configured to execute an underlying part of a given transaction.

10. The computer of claim 8, wherein the program code further comprises:

program code for broadcasting, by a profile application programming interface in the orchestration layer, updates to the plurality of common client profiles, whereby updates to the plurality of common client profiles are automatically propagated throughout the orchestration layer.

11. The computer of claim 8, wherein the program code further comprises:

program code for preventing direct updates to module client profiles of a plurality of different modules that correspondingly operate the plurality of different services.

12. The computer of claim 8, wherein the program code further comprises:

program code for adding a pre-existing service module to the plurality of services, the pre-existing service module having a pre-existing data structure for maintaining client profiles, the pre-existing data structure being incompatible with ones of data structures for others of the plurality of service modules, the pre-existing service module configured to provide a new service.

13. The computer of claim 12, wherein the program code further comprises:

program code for adding a new application programming interface to the orchestration layer, the new application programming interface configured to interface with the pre-existing service module and to provide data in the plurality of common client profiles in a form suitable for the pre-existing data structure.

14. The computer of claim 13, wherein the program code further comprises:

program code for receiving a request to access the new service from the client; and program code for providing the new service to the client via the new application programming interface and the orchestration layer using only a single set of client login credentials.

15. A computer readable storage media storing program code which, when executed by a processor, performs a computer-implemented method for enabling communication between a single client computer and a plurality of different services on one or more server computers, wherein ones of the plurality of different services have differing, incompatible corresponding client profiles, the program code comprising:

program code for receiving, at an orchestration layer maintained by an orchestration computer, a request by a client to access a service in the plurality of different services;

program code for determining, by the orchestration computer, an identity of the client from a database that stores a plurality of client identifiers for each client, the plurality of client identifiers including a general client identifier independent of the plurality of different services, the general client identifier also including a mapping from the general client identifier to a plurality of specific client identifiers associated with ones of the plurality of different services;

program code for accessing, based on the general client identifier, a particular common client profile for the client, the particular common client profile being among a plurality of common client profiles;

program code for, based on the identity, the particular common client profile, and on the request, routing, via an application programming interface gateway, the request to a specific application programming interface from among a plurality of different application programming interfaces present in the orchestration layer, wherein each of the plurality of different application programming interfaces are designed to interface with a corresponding single module stored on the server computer that provides a corresponding service;

program code for transmitting, via the specific application programming interface, needed information from the particular common client profile to a corresponding module client profile associated with a corresponding single module in a format which the corresponding single module needs, wherein the corresponding module client profile is necessary to operate the service; and program code for providing, via the server computer and after transmitting, the service to the single client computer, wherein as information in a client identifier data model changes, such changes can be pushed and pulled to individual service client profiles corresponding to ones of the plurality of different services, wherein ones of the plurality of different services are operated based on the changes that are pushed and pulled to individual service client profiles corresponding to ones of the plurality of different services.

16. The computer readable storage media of claim 15, wherein the plurality of different application programming interfaces comprises restful application programming interfaces, wherein the restful application programming interfaces are configured to break down a transaction to create a series of smaller modules, each of the smaller modules configured to execute an underlying part of a given transaction.

17. The computer readable storage media of claim 15, wherein the program code further comprises:

program code for broadcasting, by a profile application programming interface in the orchestration layer, updates to the plurality of common client profiles, whereby updates to the plurality of common client profiles are automatically propagated throughout the orchestration layer.

18. The computer readable storage media of claim 15, wherein the program code further comprises:

program code for preventing direct updates to module client profiles of a plurality of different modules that correspondingly operate the plurality of different services.

19. The computer readable storage media of claim 15, wherein the program code further comprises:

program code for adding a pre-existing service module to the plurality of services, the pre-existing service module having a pre-existing data structure for maintaining client profiles, the pre-existing data structure being incompatible with ones of data structures for others of the plurality of service modules, the pre-existing service module configured to provide a new service.

20. The computer readable storage media of claim 19, wherein the program code further comprises:

program code for adding a new application programming interface to the orchestration layer, the new application programming interface configured to interface with the pre-existing service module and to provide data in the plurality of common client profiles in a form suitable for the pre-existing data structure;

program code for receiving a request to access the new service from the client; and program code for providing the new service to the client via the new application programming interface and the orchestration layer using only a single set of client login credentials.

21. The computer readable storage media of claim 20, wherein the program code further comprises:

program code for receiving a request to access the new service from the client; and program code for providing the new service to the client via the new application programming interface and the orchestration layer using only a single set of client login credentials.

22. The computer readable storage media of claim 21, wherein the program code further comprises:

program code for broadcasting, by a profile application programming interface in the orchestration layer, updates to the plurality of common client profiles, whereby updates to the plurality of common client profiles are automatically propagated throughout the orchestration layer.

23. The computer of claim 14, wherein the program code further comprises:

program code for broadcasting, by a profile application programming interface in the orchestration layer, updates to the plurality of common client profiles, whereby updates to the plurality of common client profiles are automatically propagated throughout the orchestration layer.

24. The method of claim 7, further comprising:

broadcasting, by a profile application programming interface in the orchestration layer, updates to the plurality of common client profiles, whereby updates to the plurality of common client profiles are automatically propagated throughout the orchestration layer.

* * * * *